UNITED STATES PATENT OFFICE.

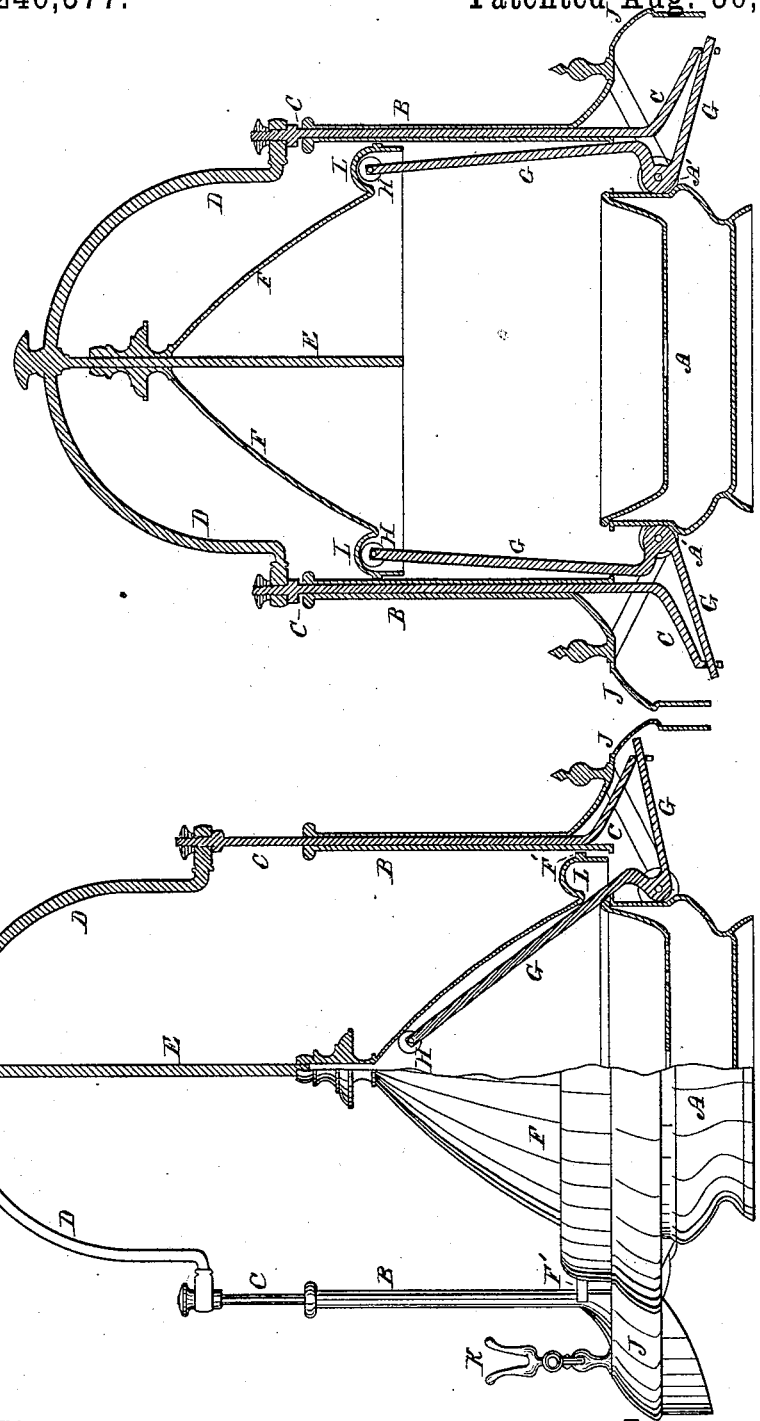

JOHN A. EADES, OF MIDDLETOWN, ASSIGNOR TO THE CROMWELL PLATE COMPANY, OF CROMWELL, CONNECTICUT.

BUTTER-DISH.

SPECIFICATION forming part of Letters Patent No. 246,377, dated August 30, 1881.

Application filed January 28, 1881. (No model.)

*To all whom it may concern:*

Be it known that I, JOHN A. EADES, of Middletown, in the county of Middlesex and State of Connecticut, have invented certain new and useful Improvements in Butter-Dishes; and I do hereby declare that the following is a full, clear, and exact description thereof, whereby a person skilled in the art can make and use the same, reference being had to the accompanying drawings, and to the letters of reference marked thereon.

Like letters in the figures indicate the same parts.

My improvement relates to butter-dishes such as are generally made of metal, and which are provided with a cover which is raised up on guides and held suspended while the dish is in use.

The object of my invention is to provide a better mechanical device for raising, lowering, and suspending the cover than has heretofore been known and used.

In the accompanying drawings, illustrating my invention, Figure 1 shows a side view of my improved butter-dish with the cover down and with a part of the exterior cut away so as to show the working parts in section. Fig. 2 is a vertical section through the whole butter-dish with the cover raised.

A is the base of the butter-dish, which holds the bowl for the butter in the usual manner.

B B are two hollow posts, attached to the fixed base, as shown on the left of Fig. 1.

C C are vertical rods, sliding in the hollow posts B and connected at the top by the arch D, forming the handle.

E is a vertical rod, also connected with the arch D, which passes through an opening in the top of the cover F, and serves as a guide upon which the cover moves up and down, confining it to a vertical movement.

F is the cover. This is provided with an opening in the top for the rod E, and it is also provided with the ears F' F', which embrace the posts B and serve as guides for the base of the cover when it moves up or down, and also prevent any rotary movement of the cover on the rod E.

G G are bent levers, turning upon pins in the studs A', forming part of the fixed base A. The upper or longer arm lies within the cover F, and is furnished with a roller, which rolls upon the inside of the cover to diminish friction. The lower or shorter arm of the lever G is embraced by a loop on the lower end of the vertical rod C, which is bent outward at its lower end to get the desired length of leverage, and is operated by the movement of the handle up or down. The projecting parts of the levers are covered by a cap, J, forming part of the base, which forms a convenient place for the knife-support K.

L is a groove in the lower edge of the cover, in which the roller H rests when the cover is raised, as shown in Fig. 2.

The operation of my improvement is as follows: The cover being down, when it is desired to raise it the handle D is pressed downward. This acts through the rods C to depress the lower or outer ends of the bent levers G, and thereby forces the inner ends, furnished with the rollers H, against the inclined surface of the cover and forces it upward. When the rollers arrive at the lower edge they enter the groove L and hold the cover in its raised position. While the cover is raised, the levers being locked by the groove L, the dish can be taken up and moved by the handle D without dropping the cover. To lower the cover it is slightly lifted by means of the knob at the top. This releases the levers and allows the handle to rise as the cover falls. The parts can be nearly poised, so as to render the movement without shock.

What I claim as my invention is—

1. The combination of the base A, with its posts B, the rods C, the handle D, the cover F, with its ears F', and the levers G, furnished with rollers H, substantially as described.

2. In combination with the devices A B C D F G, the central guide-rod, E, substantially as described.

3. The central guide-rod, E, suspended from and fixed to the handle D, and adapted to pass through an opening in the cover F, in combination with said handle and cover, substantially as described.

4. The projection J, adapted to conceal the working mechanism and support the knife-holder K, substantially as described.

JOHN A. EADES.

Witnesses:
THEO. G. ELLIS,
WILMOT HORTON.